No. 892,801. PATENTED JULY 7, 1908.
R. S. BRYANT.
LOCKING DEVICE FOR TIRE RETAINING ATTACHMENTS.
APPLICATION FILED APR. 28, 1906. RENEWED MAY 22, 1907.

WITNESSES:

Richard S. Bryant INVENTOR.

BY

ATTORNEY.

UNITED STATES PATENT OFFICE.

RICHARD S. BRYANT, OF COLUMBUS, OHIO, ASSIGNOR TO THE BRYANT STEEL WHEEL AND RIM COMPANY, OF COLUMBUS, OHIO, A CORPORATION OF OHIO.

LOCKING DEVICE FOR TIRE-RETAINING ATTACHMENTS.

No. 892,801.          Specification of Letters Patent.          Patented July 7, 1908.

Application filed April 28, 1906, Serial No. 314,230. Renewed May 22, 1907. Serial No. 375,053.

*To all whom it may concern:*

Be it known that I, RICHARD S. BRYANT, a citizen of the United States, residing at Columbus, in the county of Franklin and State of Ohio, have invented certain new and useful Improvements in Locking Devices for Tire-Retaining Attachments, of which the following is a specification.

My invention relates to improvements in locking device for tire-retaining attachments, especially of the construction shown in my pending application, Serial Number 270,218 and comprises improved means for preventing the elastic locking ring from being unseated by severe usage.

It consists essentially of a clasp member adapted to be positioned upon a lug extending below the rim body, to engage the locking ring and prevent the same from being unseated by usage, and to hold the same securely in its normal position against the tire-retaining ring. For the accomplishment of these purposes, the rim body and the clasp member are constructed and modified and the parts are arranged as hereinafter set forth.

Figure 1:
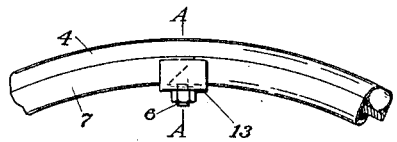
Figure 3:
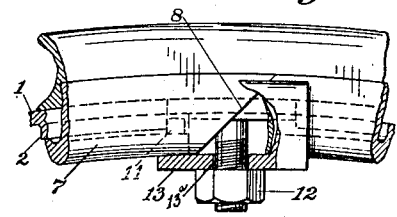
Figure 2:
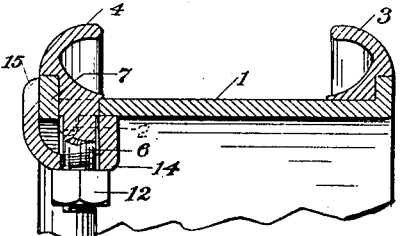
Figure 4:
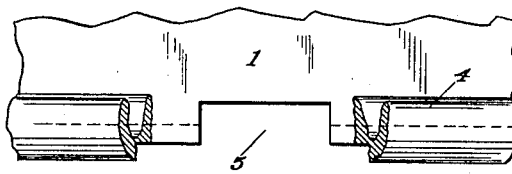
Figure 5:
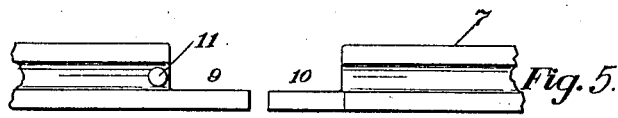
Figure 6:
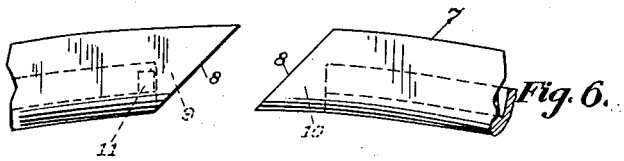

In the accompanying drawings Figure 1 is a side view of a portion of the rim with parts in place thereon; Fig. 2 is a cross section along the line A—A of Fig. 1; Fig. 3 is a side view of the securing device, with parts broken away; Fig. 4 is a top view; Fig. 5 is a top view of a portion of the locking ring; Fig. 6 is a side view of Fig. 5.

Referring to the drawings in which the same reference numerals indicate like parts throughout, 1 is the rim body having the downturned flange 2 at its outer edge; 3 is the inner tire-retaining ring, 4 is the outer tire-retaining ring adapted to be positioned laterally upon the rim body after the tire has been seated thereon; in one form of construction herein shown, the rim body is recessed at 5 and adapted to receive a depending lug or bolt 6 secured to the outer tire-retaining ring; when the ring is positioned the lug enters the recess in the rim, and the ring is thereby positively held against slipping on the rim. To lock the tire-retaining ring in position on the rim as against the pressure due to the outward expansion of the tire, I provide the double-flanged locking ring 7, which is adapted to expand into position upon the downturned flange 2 by its own elasticity, and is held in position by the engagement of its inner flange with the inner face of the flange 2 upon the rim body; while its outer flange extends upwardly above the rim body and engages against the tire-retaining ring, and holds the same against the lateral pressure due to the inflation of the tire.

The ends of the locking ring are constructed to overlap as shown at 8 when in position upon the ring; the inner flange of the locking ring is cut away at 9 and adapted to abut circumferentially against the lug 6; between the flanges of the locking ring near one end thereof is a small lug 11, and when the ring is being positioned the lug 11 is brought into the recess and fitted snugly against the end of the down-turned flange on the rim body and the ring is then sprung into place, the ends of said ring being cut away upon the inner flange to receive the bolt or lug depending from the tire-retaining ring and positioned in the recess in the rim body. The locking ring is thereby held against any tendency thereof to creep in either direction on the rim body, and the outer tire-retaining ring is also maintained against circumferential creeping. The lug 6 is threaded and adapted to receive a nut 12.

A clasp member 13, having an opening 13$^a$, and being substantially ⊔-shaped in cross section, is adapted to be slipped upon the lug 6, and to embrace the locking ring 7, one flange 14 engaging the exterior face of the inner flange of said locking ring as shown in Fig. 2, and the outer flange 15 lying against the outer face of the locking ring, covering the line of junction of the two ends thereof, and embracing the locking ring to prevent the displacement of the same. When the nut is placed, the whole construction is secured firmly against lateral pressure due to expansion of the tire, and is absolutely prevented from circumferential movement, and the locking ring is securely held in position against the most severe jarring or strains due to usage.

The above described construction embodies a fastening device for locking rings which is positive in its operation, durable, easy to adjust, and simple in its construction. It may be given other forms to accomplish the purposes set forth but I desire to claim all such changes as fall within the scope of my invention.

What I claim as new and desire to secure by Letters Patent is:—

1. A locking device for tire-retaining attachments comprising a rim body having a recess at one edge thereof, a downturned flange on said edge, a tire-retaining ring mounted on said rim body, a lug on said ring adapted to enter said recess, a broken locking ring adapted to expand into engagement with said rim body and said tire-retaining ring, means adapted to engage said lug and to embrace said locking ring when positioned, and means for securing said means in place.

2. A locking device for tire-retaining attachments, comprising a rim body having a recess at one edge thereof, a downturned flange on said edge, a tire-retaining ring mounted on said rim, a lug on said ring adapted to enter said recess, a broken locking ring having radial flanges adapted to expand into engagement with said downturned flange on said rim body and to embrace the same, the inner flange on said locking ring being cut away at the ends of said ring to permit the same to abut against said lug, means adapted to engage said lug and embrace said locking ring, and means for securing said means in place.

3. In a locking device for tire-retaining attachments, a rim body having a recess at one edge thereof, a downturned flange on said edge, a detachable tire-retaining ring on said rim body, a lug depending therefrom, a broken locking ring having radial flanges, a second lug between said flanges, said lug being adapted to be positioned in said recess against an end of said downturned flange, whereby said locking ring is held against circumferential movement, and means adapted to embrace said locking ring and to engage said first mentioned lug to lock the parts securely upon the rim body.

In testimony whereof I affix my signature in the presence of two witnesses.

RICHARD S. BRYANT.

Witnesses:
 GEO. W. RIGHTMIRE,
 ARVILLA RAGER.